United States Patent [19]

White

[11] Patent Number: 5,020,367

[45] Date of Patent: Jun. 4, 1991

[54] TANK-LEVEL GAUGE

[75] Inventor: John J. White, Wilmette, Ill.

[73] Assignee: Midland Manufacturing Corp., Skokie, Ill.

[21] Appl. No.: 576,976

[22] Filed: Sep. 4, 1990

[51] Int. Cl.[5] .................... G01F 23/62; G01F 23/56
[52] U.S. Cl. .................................. 73/319; 73/322; 73/DIG. 5
[58] Field of Search ............. 73/319, 322, 305, DIG. 5

[56] References Cited

U.S. PATENT DOCUMENTS

| | | | |
|---|---|---|---|
| 50,581 | 10/1865 | Herris | 73/DIG. 5 |
| 1,202,854 | 10/1916 | Knight | 73/DIG. 5 |
| 1,363,139 | 12/1920 | Mason | 73/322 |
| 2,371,511 | 3/1945 | Faus | 73/DIG. 5 |
| 2,526,784 | 10/1950 | Walker | 73/319 |
| 2,556,346 | 6/1951 | Stromberg | 73/319 |
| 2,558,118 | 6/1951 | Yost | 73/319 |
| 2,634,608 | 4/1953 | Sorber | 73/DIG. 5 |
| 2,771,774 | 11/1956 | Fornasieri | 73/319 |
| 4,154,103 | 5/1979 | FLing | 73/315 |
| 4,248,088 | 2/1981 | McGown et al. | 73/319 |
| 4,475,290 | 10/1984 | Colditz | 73/319 |
| 4,924,703 | 5/1990 | White et al. | 73/DIG. 5 |

FOREIGN PATENT DOCUMENTS

| | | | |
|---|---|---|---|
| 1127098 | 4/1962 | Fed. Rep. of Germany | 73/DIG. 5 |
| 1139660 | 11/1962 | Fed. Rep. of Germany | 73/DIG. 5 |
| 0878190 | 9/1961 | United Kingdom | 73/DIG. 5 |

Primary Examiner—William A. Cuchlinski, Jr.
Assistant Examiner—Diego F. F. Gutierrez
Attorney, Agent, or Firm—Emrich & Dithmar

[57] ABSTRACT

The tank-level gauge comprises an outer tube sealed at its lower end and adapted for attachment to the top wall of a tank. The gauge also comprises two telescoping rods axially movable within the outer tube. A float encircles the outer tube. Magnets respectively attach to the float and to the lower end of the inner gauge rod, whereby a rising level causes such inner rod to rise as well. When the liquid level reaches a predetermined level, the inner gauging rod becomes disconnected and a magnet on the outer gauging rod becomes coupled to the float magnet, whereby the outer gauging rod continues to rise. Indicia on the inner gauging rod provide information on the height of the liquid in the tank from its empty condition to a partly full condition. Indicia on the outer gauging rod provide information on the quantity of liquid in the tank from its partly full condition to its full condition.

11 Claims, 1 Drawing Sheet

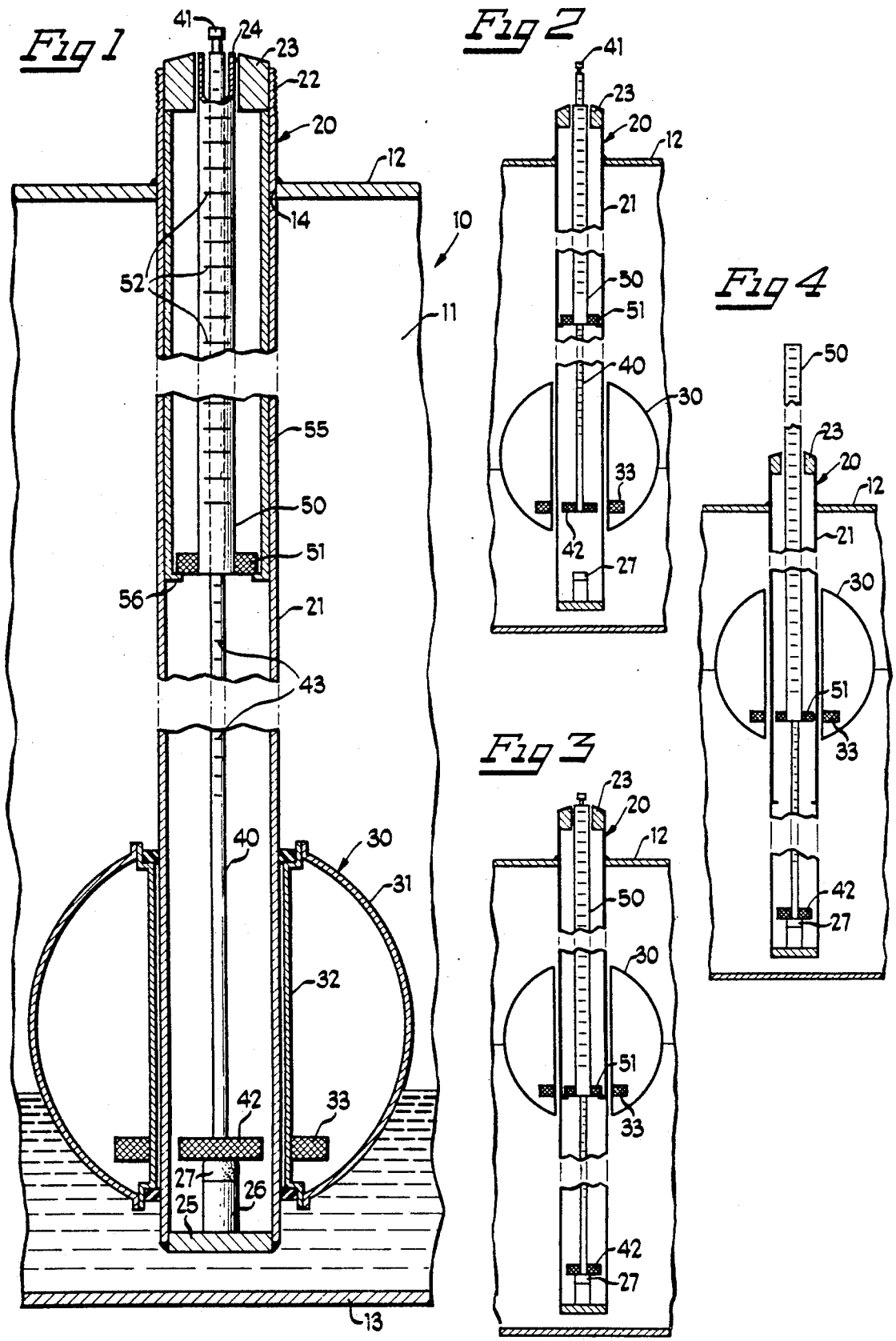

TANK-LEVEL GAUGE

BACKGROUND OF THE INVENTION

U.S. Pat. Nos. 3,815,416 and 4,924,703 assigned to the assignee of this patent application, disclose prior art apparatuses for indicating the level of liquid in a tank. The patented apparatuses comprise a float encircling the tube extending down into the tank. The float is magnetically coupled to a gauging rod which bears indicia representing the level of liquid in the tank. As the liquid level rises, the float carries the rod upwardly. The tankerman is apprised of the level in the tank by the visible indicia on the rod. Each patented apparatus also has a mechanism for automatically visually and audibly alerting the tankerman when the liquid has reached a particular level, such as near full.

The apparatus disclosed in these two patents is particularly suited for relatively shallow tanks, say on the order of about eight feet. In the case of deeper tanks, the longer rod protrudes more from the tank, which creates problems with overhead clearance and obstructions, susceptibility of rod bending or breaking from wind forces or inadvertent collision with other objects, and a weakening of the magnetic coupling due to the weight of the rod.

SUMMARY OF THE INVENTION

It is, therefore, an important object of the present invention to provide a tank-level gauge which can be used with deeper tanks.

In summary, there is provided a tank-level gauge for use in indicating the level of liquid in a tank, comprising an outer tube having a lower end for extending into the tank and an upper end for protruding from the tank, a float encircling the outer tube, whereby a rising level of liquid in the tank would cause the float to rise, first magnet means in the float generally of ring shape and encircling the outer tube, a plurality of gauging rods disposed inside the outer tube and axially movable therein and each having lower and upper ends, second magnet means attached to the lower end of one of the gauging rods and being adapted to magnetically couple to the first magnet means, whereby a rising level of liquid in the tank would cause the one gauging rod to rise, third magnet means attached to the lower end of another of the gauging rods and being adapted to magnetically couple to the first magnet means, whereby a rising level of liquid in the tank would cause the another gauging rod to rise, and means for defining a level above which the second magnet means cannot rise and below which the third magnet means cannot fall.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts a fragmentary portion of a tank in which is mounted a tank-level gauge depicted partly in vertical section and partly fragmented, and constructed according to the features of the present invention;

FIG. 2 is a fragmentary schematic view like FIG. 1, depicting the condition of the tank-level gauge when the liquid level is low;

FIG. 3 is a view like FIG. 2, depicting the gauge when the tank is about half full; and FIG. 4 is a view like FIG. 2, depicting the gauge when the tank is somewhat more than half full.

DETAILED DESCRIPTION OF THE PREFERRED EMBODIMENT

Turning now to the drawings, and more particularly to FIG. 1 thereof, there is depicted a tank which is shown in fragmentary portion. The tank 10 has side walls 11, a top wall 12, and a bottom wall 13. The top wall has an opening 14 therein. The tank could have a nozzle such as that depicted in U.S. Pat. No. 4,924,703.

At the dock, the level of liquid in tank 10 may be determined and, for that purpose, there is provided gauge 20 incorporating the features of the present invention. Gauge 20 comprises an outer tube 21 which preferably is composed of corrosion-resistant, non-magnetic material in order to withstand corrosive liquids if they are stored in tank 10. Stainless steel in the 300 series may be utilized. Tube 21 extends through opening 14 and is attached thereto by welding. The upper end of tube 21 is threaded at 22 for threadedly receiving a cap (not shown) when gauge 20 is not in use. A bushing 23 is disposed in the upper end of outer tube 21 and has a bore 24 extending therethrough A sealing plug 25 is seal welded on the lower end of tube 21. An upstanding lug 26 welded on plug 25 carries a rubber bumper 27. Alternatively, lug 27 could be integral with plug 25. Gauge 20 comprises a float 30 including a hollow, spherical shell 31 and a tube 32 hermetically attached together. Tube 21 passes through tube 32 so that float 30 can freely move with change in liquid level. The float is also preferably made of corrosion-resistant, nonmagnetic material. Within float 30 is a ring-shaped magnet 33, which is attached to the inside wall of shell 31 and encircles tube 21. Thus, as float 30 rises, magnet 33 carried thereby also rises.

Tank-level gauge 20 further comprises a pair of axially movable telescoping rods 40 and 50 preferably made of light-weight material such as aluminum. The length of rod 40 is on the order of about the height of the tank although a shorter or longer rod could be employed. In the upper end of rod 40 is a tip 41 which protrudes upwardly therefrom and is above bushing 23. At the other end of rod 40 is a disc-like magnet 42, which, at rest, is at the same height as magnet 33. Attachment of magnet 42 to rod 40 may, for example, be by means of a pin attached to rod 40 and extending downwardly therefrom into a hole in magnet 42. Imprinted or applied on the exterior of rod 40 are indicia (schematically indicated as horizontal lines) signifying the depth of liquid in the tank. The indicia appear at the top of bushing 23 as rod 40 rises.

Rod 50 is actually a tube in the embodiment depicted. Preferably, rod 50 is about one-half the length of rod 40. Rod 40 extends through bore 24 in bushing 23 and rod 40 extends through rod 50. Attached to the lower end of rod 50 is a ring-shaped magnet 51 having a height generally corresponding to the height of magnet 33. Rod 50 bears indicia 52 signifying the depth of liquid in the tank.

Affixed to the inside wall of tube 21 is a sleeve 55, the lower end of which is inturned to define an annular ledge 56. Magnet 51 rests by gravity on ledge 56. The inside diameter of ledge 56 is such as to preclude movement of magnet 42 any higher.

When tank 10 is empty, or at least the level depicted in FIG. 1 or below, float 30 is located at the bottom of outer tube 21 and tip 41 is visible to the tankerman. As the liquid in tank 10 rises, float 30 also rises, carrying magnet 33 mounted therein upwardly. Gauging rod 40 also rises because of the magnetic coupling between magnets 33 and 42. As the liquid level rises, the different indicia on rod 40 are visible, indicating the level of the liquid. FIG. 2 illustrates this starting to occur and rod 40 starting to protrude upwardly beyond bushing 23.

As the liquid continues to rise, float 30 will carry magnet 42 upwardly until it strikes ledge 56. Magnet 42 can rise no further. As float 30 continues to rise, nothing restrains rod 40 and it falls by gravity until magnet 42 strikes bumper 27. When float 30 reaches this position, magnet 33 becomes aligned with magnet 51, as depicted in FIG. 3. As the liquid in the tank rises, float 30 continues to rise, carrying magnet 51 upwardly and thus gauging rod 50 is also moved upwardly. The indicia 52 on the tank become sequentially visible to the tankerman signifying the level in the tank. This is depicted in FIG. 4.

When filling is complete, whichever gauge rod is protruding may be manually depressed, whereupon it will fall by gravity to its rest position.

Say tank 10 is fourteen feet in height, in which case, rod 40 would also be about fourteen feet long. For further example, gauging rod 50 could be seven feet long. In such example, rod 40 will project a maximum of about seven feet above the tank. At that point, its magnet 42 strikes ledge 56 and it falls to the bottom. Thus, the tank level gauge of the present invention provides information on the depth of liquid in a fourteen foot tank without any rod projecting more than seven feet. Thus, disadvantages of excessive protruding of the gauge rod above the tank top are avoided. Although a specific example of the lengths of the gauging rods have been described, it is understood that various lengths of the telescoping gauging rods could be used. Furthermore, although rod 40 is telescoped into rod 50, a reverse telescoping arrangement could be employed. Furthermore, the particular embodiment describes two telescoping rods, but a greater plurality could be used. Of course, the indicia could indicate the depth of tank yet unfilled instead.

What has been described therefor is an improved tank-level gauge which enables the tankerman to monitor the level of a relatively deep tank without long gauging rods.

What is claimed is:

1. A tank-level gauge for use in indicating the level of liquid in a tank, comprising an outer tube having a lower end for extending into the tank and an upper end for protruding from the tank, a float encircling said outer tube, wherein a rising level of liquid in the tank would cause said float to rise, first magnet means in said float generally of ring shape and encircling said outer tube, a plurality of gauging rods disposed inside said outer tube and axially movable therein and each having lower and upper ends, second magnet means attached to the lower end of one of said gauging rods and being adapted to magnetically couple to said first magnet means, wherein a rising level of liquid in the tank would cause said one gauging rod to rise so as to be visible above the tank which will indicate the level of the liquid in the tank, third magnet means attached to the lower end of another of said gauging rods and being adapted to magnetically couple to said first magnet means, wherein a further increase in the level of liquid in the tank would cause said another gauging rod to rise so as to be visible above the tank which will indicate the level of the liquid in the tank, and means on said outer tube for defining a level above which said second magnet means cannot rise and below which said third magnet means cannot fall.

2. The tank-level gauge of claim 1, wherein said plurality is two.

3. The tank-level gauge of claim 1, wherein said plurality is two, said one gauging rod being inside said another gauging rod.

4. The tank-level gauge of claim 1, wherein said plurality is two, the length of said one gauging rod being on the order of about two times the length of said another gauging rod.

5. The tank-level gauge of claim 1, wherein said level defining means is an angular ledge that supports said third magnet means at its lowest level and precludes further elevation of said second magnet means.

6. The tank-level gauge of claim 5, and further comprising a sleeve fixed in said outer tube and carrying said annular ledge.

7. The tank-level gauge of claim 1, and further comprising bumper means at the lower end of said outer tube for supporting said second magnet means.

8. The tank-level gauge of claim 1, wherein said second magnet means is ring-shaped.

9. The tank-level gauge of claim 1, wherein said third magnet means is ring shaped.

10. The tank-level gauge of claim 1, and further comprising indicia on the exterior of each of said gauging rods.

11. The tank-level gauge of claim 1, and further comprising a bushing at the upper end of said outer rod and having a guide hole therethrough for said gauging rods.

* * * * *